May 4, 1965  W. WALLACE  3,181,617
PEANUT HARVESTER
Filed April 1, 1963  2 Sheets-Sheet 1

INVENTOR.
WILBUR (N) WALLACE
BY
Dunlap, *Laney & Hubbard*
ATTORNEYS

May 4, 1965  W. WALLACE  3,181,617
PEANUT HARVESTER
Filed April 1, 1963  2 Sheets-Sheet 2
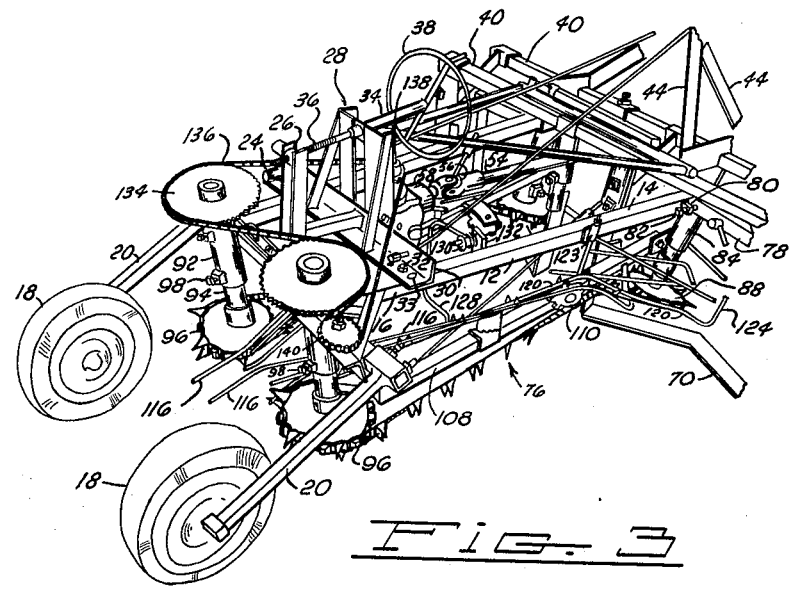
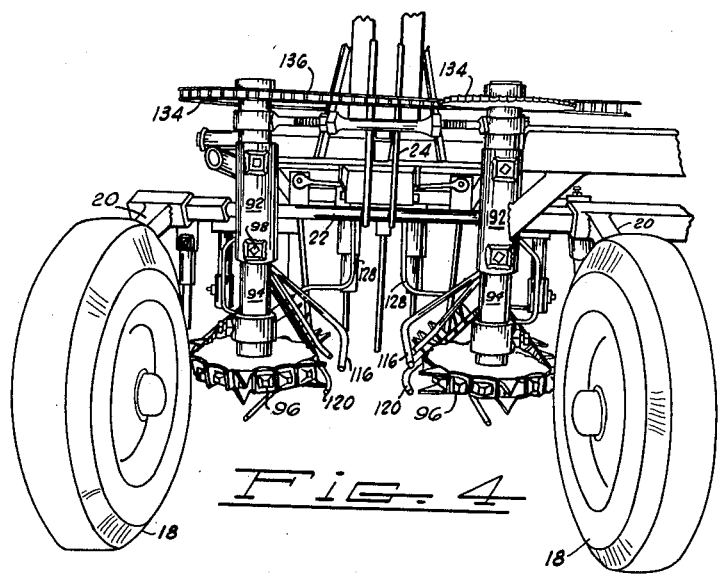
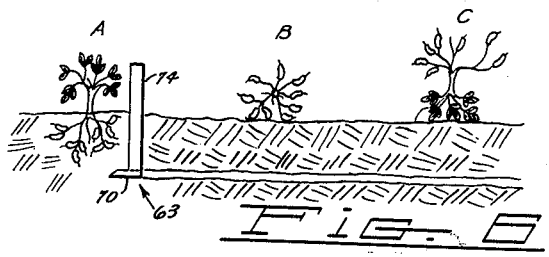
INVENTOR.
WILBUR (N) WALLACE
BY
ATTORNEYS

United States Patent Office 3,181,617
Patented May 4, 1965

3,181,617
PEANUT HARVESTER
Wilbur Wallace, 120 E. 18th St., Portales, N. Mex.
Filed Apr. 1, 1963, Ser. No. 269,638
1 Claim. (Cl. 171—61)

This invention relates to agricultural machinery and more particularly but not by way of limitation, to an improved machine for harvesting peanuts.

It is known in the art of harvesting to provide agricultural machinery which is particularly adapted for the harvesting of peanuts. A number of these machines utilize endless belts in some respect, as for example, in the provision of flat conveyor belts for conveying peanut vines to a trailer receptacle. However, the presently obtainable peanut harvesting machines have not proved successful in the field, with the result that at present almost all peanut harvesting is performed by hand by migrant farm labor. Thus, it is apparent that a very real need exists for a practical and economical agricultural machine which efficiently harvests peanuts.

The present invention contemplates a peanut harvester which is adapted to be drawn down at least one row of peanut vines and to be powered by a conventional farm tractor. The peanut harvester comprises a carriage having a leading end and a trailing end and adapted to be attached as a trailer to the farm tractor. At least one peanut digging plow or digger is carried by the carriage at its leading end and is arranged to sever a row of peanut vines from the earth by digging under the peanut carrying roots thereof as the carriage is drawn longitudinally along the row. At least one toothed chain conveyor unit is carried by the carriage and is powered from a power take-off of the tractor. This conveyor unit is adapted to grasp the peanut vines at a medial portion after they have been severed from the earth by the digging plow and to convey them to the trailing end of the carriage where they are deposited upside down on the earth for drying.

More particularly, prior to being severed from the ground the peanut vines are substantially vertically positioned in the ground with the peanut bearing roots thereof extending below the surface of the ground. After the digger of the novel peanut harvester is passed beneath these peanut bearing roots, the body portions of the vines are grasped by the chain conveyor unit and the vines are lifted from the ground. As they are carried from the leading to the trailing end of the carriage, they are gradually turned over so that their original position is reversed with the peanut bearing roots now extending upwardly into the air for drying thereof. It will be understood that after the earth surrounding the peanuts has been given an opportunity to dry, the peanuts may be separated from the vines and the earth in any suitable manner.

The present invention provides a specific toothed chain conveyor unit which efficiency handles the peanut vines after they have been dug from the ground and deposits them in a predetermined position behind the machine without permitting the dug vines to slip from the machine or to bind up in the machine and not be deposited on the ground behind the carriage as desired.

An object of this invention is to provide a machine which will successfully harvest all kinds and sizes of peanuts.

Another object of this invention is to provide a harvesting machine which is readily attachable to a conventional farm tractor so as to be propelled, controlled and operated therefrom.

Another object of this invention is to provide a practical harvesting machine which efficiently harvests peanuts.

A further object of this invention is to provide a simple peanut harvester which is easy to construct, economical to maintain and to operate.

A further object of this invention is to provide a peanut harvester which efficiently removes peanut vines from the ground and deposits them upside down upon the ground for a drying thereof.

A still further object of this invention is to provide a peanut harvester which effectively deposits dug peanut vines behind the harvester without permitting the vines to bind up within the harvester or to slip from the harvester during its operation.

Yet another object of this invention is to provide a peanut harvesting machine that may be operatively connected to conventional tractors now in use and which may be operated from a power take-off of such tractors.

Yet still another object of this invention is to provide a peanut harvester which removes vines having peanut bearing roots from the ground and deposits them upon the ground in a position permitting easy separation of the peanuts from adhered dirt without injury to the peanuts themselves.

Other objects and advantages of the invention will be evident from the following detailed description, when read in conjunction with the accompanying drawings, which illustrate the invention.

In the drawings:

FIG. 4 is a view of the trailing end of the harvesting machine shown in FIG. 1 and illustrates the point at which the peanut vines are deposited by the machine.

FIG. 5 is a fragmentary detail sectional view of a chain used in the toothed chain conveyor unit.

FIG. 6 is a schematic view illustrating the operation performed on peanut vines by the harvester.

Figure 1:
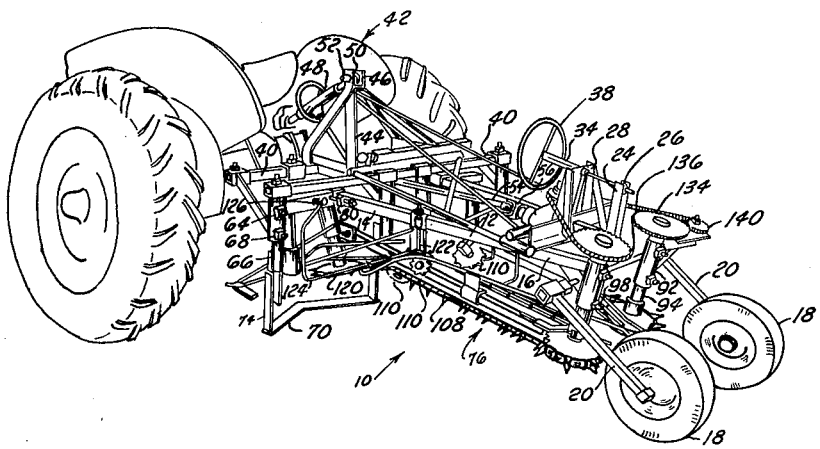
FIG. 1 is a schematic view illustrating a harvesting machine constructed according to the invention and attached to a conventional farm tractor.

Referring to the drawings in detail, reference character 10 designates a peanut harvester constructed in accordance with this invention and provided with a carriage 12 having a leading or front end 14 and a trailing or rear end 16. A plurality of supporting or ground wheels 18 are rotatably secured to members 20 that are secured to a cross member 22 so as to permit variable spacing of the wheels 18. The cross member 22 is rotatably secured to the trailing end 16 of the carriage 12. The cross member 22 is rotatable so as to raise or lower the wheels 18 and to thereby poistion the trailing end 16 of the carriage 12 with relation to the ground as desired.

A means for rotating the member 22 is provided in the form of an upright member 24 secured to the rotatable member 22. A threaded nut 26 is carried in the upper portion of the member 24. An upright standard 28, having a cross member 30, is secured to the carriage 12 in a suitable manner, such as by bolts 32 extending through selected apertures 33. A rod or shaft 34 is journaled in the member 28 and is provided with a threaded portion 36 which threadedly engages the nut 26. A suitable hand wheel 38 is secured to the shaft 34. It will be apparent that rotation of the hand wheel 38 rotates the shaft 34 and causes the upper portion of the member 24 to move either toward or away from the trailing end 16 of the carriage 12. The movement of the member 24 rotates the member 22 and provides for a desired vertical movement of the trailing end 16 of the carriage 12 with respect to the supporting wheels 18. A plurality of cross members or cross bars 40 are secured to the front end 14 of the carriage 12 in a suitable manner for a purpose which will hereinafter be set forth more fully.

Figure 2:
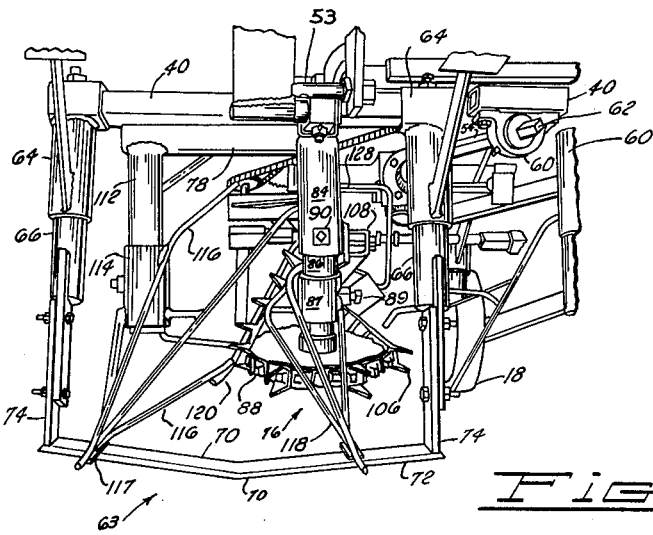
FIG. 2 is a front end view of the harvesting machine shown in FIG. 1 and illustrates a digging means carried by the harvester.
Figure 3:
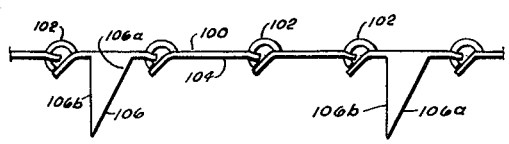
FIG. 3 is a perspective view of the harvester shown in FIG. 1 and illustrates a toothed chain conveyor unit carried by the harvester.

A means for securing the peanut harvester 10 to a conventional farm tractor, generally designated by reference character 42, is provided. This means includes a conventional "3 point hitch" which is used with many tractors and implements and comprises a plurality of upright members 44 secured at their lower ends to the cross bars 40. The members 44 converge at their upper ends and are secured to a suitable hub member 46. A suitable connecting member 48 extends outwardly from the tractor 42 and terminates at its outer end in a shaft 50. A bolt 52 passes transversely through the hub 46 and the shaft 50 of the member 48 to secure the peanut harvester 10 to the tractor 42. A pin 53 carried on each side of the carriage 12, shown in FIG. 2, is adapted to be secured to a pull arm (not shown) carried by the tractor and comprises a portion of the "3 point hitch." Thus, the harvester 10 may be pulled by the tractor 42 as a trailer attachment.

A means for powering the peanut harvester 10 from a power take-off (not shown) of the tractor 42 is provided. In the peanut harvester illustrated in the drawings, this means takes the form of a driven shaft 54 which is connected at one end through a suitable U-joint connection 56 to a gear box 58. The gear box 58 is of conventional construction and translates rotational movement in one plane into rotational movement in a perpendicular plane. The portion of the drive shaft 54 extending toward the leading end 14 of the carriage 12 is journaled in a suitable bearing box 60 secured to a cross bar 40, as shown in FIG. 2. The portion 62 of the drive shaft 54 which extends beyond the bearing box 60 is rectangular in configuration so that it may be inserted in the conventional power take-off (not shown) of the farm tractor 42. It will be understood that the rectangular shaft 62 extends into the power take-off (not shown) of the tractor 42 and is operated thereby as in the normal operation of machinery driven from a power take-off.

A suitable peanut digging means 63 is provided for the harvester 10. In the embodiment shown in the drawings, this means may take the form of a plurality of downwardly extending tubular members 64, a spaced pair of which are secured to the cross bars 40 on either side of the carriage 12. A pair of spaced tubular members 66 extend into said pair of tubular members 64 and are secured therein by a plurality of transversely extending bolts 68, as seen in FIG. 1. A peanut digger or plow 70, which may be substantially V-shaped in configuration with a beveled leading edge 72, has a pair of upright members 74 secured to each end thereof. The upright members 74 are secured to the tubular members 66 in a suitable manner. It will be understood that the bolts 68 extend through the tubular members 64 into contact with the tubular member 66 and secure the peanut digger 70 in a predetermined position with respect to the carriage 12.

A means is provided for grasping the peanut vines at a medial portion after they have been severed from the earth by the digging means 63 and conveying them to the trailing end 16 of the carriage 12 where they are deposited upside down on the earth for drying. In the illustrated peanut harvester, this means may take the form of a toothed chain conveyor unit 76. A suitable cross arm 78 is slidably disposed on the leading end 14 of the carriage 12 for longitudinal movement there along. A nut 80 is secured to the leading edge 14 of the carriage 12 in any suitable manner such as by welding. A threaded bolt 82 extends through the nut 80 and contacts the cross arm 78 for positioning the arm 78 on the carriage 12 for a purpose which will hereinafter be set forth more fully.

A downwardly extending tubular member 84 is secured to the cross member 78. A second tubular member 86 having a toothed pulley or gear 88 journaled at the lower end thereof extends upwardly into the tubular member 84. A suitable locking means, such as a threaded bolt 90 extending transversely through the first tubular member 84 into locking contact with the second tubular member 86, secures the tubular member 84. A sleeve 87 is also secured to the lower portion of member 86 by a suitable locking means 89.

A downwardly extending tubular member 92 is secured to the trailing end 16 of the carriage 12. A tubular member 94, having a shaft (not shown) journaled therein, extends upwardly into the tubular member 92, as shown in FIG. 4. The shaft (not shown) which rotatably extends through the tubular members 92 and 94, is keyed and set screwed at its lower end to a sprocket 96. A suitable locking means, which may take a form of a threaded bolt 98 extending transversely through the member 92 into contact with the member 94, secures the members 94 within the members 92.

An endless flexible chain 100, shown in detail in FIG. 5, extends around the pulleys 88 and 96. The chain 100 comprises a plurality of spaced arcuate members 102 which are joined by a plurality of link members 104. Each of selected spaced link members 104 is provided with a pair of spaced upraised teeth 106. As an example, but not by way of limitation, the link member 104, which is provided with upraised teeth 106, may be every third occurring member. The teeth 106 are provided with a sloping leading edge 106a and with a trailing edge 106b which is perpendicular to the chain 100. The specific configuration of the teeth 106 is provided for a purpose which will be hereinafter set forth more fully.

As the chain 100 extends rearwardly from the pulley 88 to the pulley 96 it is turned over so that at an intermediate portion of the carriage 12 the chain 100 is crisscrossed. A means of turning over the chain 100 is provided by a member 108 which is secured in a suitable manner to the tubular member 84 and to the tubular member 94, located at the trailing end 16 of the carriage 12. A pair of idler pulleys 110 turn the chain 100 over and it is crisscrossed at an intermediate portion.

A guide means is provided which cooperates with the toothed chain 100 to guide the severed peanut vines from the leading end of the carriage 12 to the trailing end 16 thereof. This guide means may take the form of a downwardly extending member 112 which is secured to the outer end of the cross member 78 in a suitable manner, such as by welding. A sleeve 114 is slidably disposed upon the lower portion of the member 112 and secured thereto in a suitable manner. A plurality of guide arms 116, which converge in a terminating point 117 at the leading end 16, are secured to the sleeve 114 for guiding the dug peanut vines into a position where they may be contacted by the chain 100. The guide arms 116 extend rearwardly for cooperating with the toothed chain 100 to convey the peanut vines, after they have been severed from the ground, to the trailing end 16 of the carriage 12. The guide arms 116 are affixed at various points to the member 108 for a stabilization thereof. A plurality of guide arms 118 are secured to the tubular member 86 in a manner so as to cooperate with the guide arms 116 in guiding the peanut vines into correct position for being grasped by the toothed chain 100.

A further means cooperating with the toothed chain 100 for guiding the peanut vines from the leading end of the carriage 12 to the trailing end 16 thereof is provided in the form of a guide arm 120. The guide arm 120 is angularly deformed so that it lies between the pairs of spaced teeth 106 of the chain 100 and conforms to the configuration of the chain 100 as it is turned over in the distance between the pulleys 88 and 96. The guide arm 120 is provided at an intermediate point with an upwardly extending arm 122 which is journaled in a suitable sleeve 123 secured to the carriage 12. The leading end of the guide arm 120 is provided with an upwardly extending portion 124 which is secured through a suitable spring means 126 to the cross member 78. Similarly the trailing end of the guide arm 120 is provided with an upwardly extending portion 128 which is secured through a suitable spring means 130 to a flange 132 that is bolted to the carriage 12. The spring means 126 and 130 bias the guide arm inwardly into contact with the chain 100. It is to be understood that the guide arm 120 is biased against a portion of the chain 100 for cooperation therewith to grasp the peanut vines after they are severed from the ground by the digging means 63 and to turn them over as they are carried to the trailing end of the carriage 12 where they are deposited on the ground.

A means of driving the chain conveyor unit 76 from a power take-off of the tractor 42 comprises a toothed gear or pulley 134 secured to the upper end of the shaft (not shown) which has the sprocket 96 secured to its lower end. The aforesaid shaft extends through the tubular members 92 and 94. An endless chain 136 passes around said pulleys 134 and a gear 138, which provides rotational output from the gearbox 58. An idler pulley 140 is also driven by the chain 136. It will be understood that the gear box 58 is driven by the shaft 54 extending from the power take-off of the tractor 42. The gear 138 through chain 136 drives the gears 134 which in turn drive the chain 100 so that the conveyor means 76 is driven from the power take-off of the tractor. Although only one side of the harvester 10 has been described in some instances in the foregoing description, it is to be understood that the other side of the harvester will be the same.

*Operation*

In operating the novel peanut digger 10 the digger is first connected to a conventional farm tractor 42 so that it may be powered and drawn thereby. The digger 10 is hitched to or connected to the tractor 42, as hereinbefore described. The drive shaft 54 is also secured in a suitable manner to the power take-off (not shown) of the tractor 42. The supporting wheels 18 are then spaced apart according to the width of the rows of peanut vines along which the peanut digger 10 is to be drawn. The spacing of the wheels 18 is accomplished by correctly spacing the members 20 on the cross member 22. The bolts 32 are positioned in the apertures 33 in the cross member to determine the spacing of the tubular members 92 and the width of the rear of the harvester 10 according to whether light or heavy peanut vines are to be harvested.

The tension on the chain 100 is determined by movement of the bolt 82 within the nut 80 since the cross arm 78 is slidably disposed upon the carriage 12. The movement of the bolt 82 moves the cross arm 78 longitudinally along the carriage 12 and determines the tension placed on the chain 100 which is driven from the power take-off of the tractor 42. The depth to which the digging means 63 will cut is then adjusted according to the depth in the ground of the roots of the peanut vines which are to be dug or harvested.

The peanut harvester 10 is then drawn along a pair of spaced rows of peanut vines by the tractor 42. Each digger 70 cuts or plow beneath each row of peanut vines, shown at point A in FIG. 6, and severs the vines from the earth. As the peanut vines are severed from the earth, the guide members 116 and 118 cooperate to guide the vines into a position where a medial portion of the vines which can be grasped by the toothed chain 100 cooperating with the guide arm 120. As the peanut vines are grasped by the toothed chain 100 and the guide arm 120 they are lifted from the ground and as they are passed or conveyed toward the trailing end 16 of the carriage 12 they are turned over, as shown at point B in FIG. 6, by the crisscrossing of the chain 100. Since the guide arm 120 is biased against the chain 100 the correct tension is brought to bear against the peanut vines so that they may be securely held against the chain 100 and are precluded from slipping from the grasp of the chain 100 and the guide arm 120. The guide arms 116 also cooperate with the chain 100 for conveying the vines. The peanut vines are then deposited behind the peanut digger 10 upside down so that they may be dried before being picked up from the ground in any suitable manner, shown at point C in FIG. 6.

The particular configuration of the teeth 106 of the chain 100 permits the peanut vines to be efficiently deposited behind the machine and effectively precludes the vines from tending to be drawn by the chain 100 back toward the leading end 14 of the carriage 12, thereby causing a binding of the vines within the conveyor unit 76. If it is so desired, the travel of the tractor 42 along the ground may be adjusted so that the harvested peanut vines are deposited behind the peanut digger 10 in substantially the area of the ground from which they were dug.

From the foregoing, it is apparent that the present invention provides a practical and economical mechanized harvester which efficiently harvests peanuts. This novel peanut harvester may be easily attached to a conventional farm tractor so as to be propelled, controlled, and operated therefrom. The present harvester also efficiently removes peanut vines from the ground after they have been severed from contact with the ground and deposits them upside down upon the ground for a drying thereof. It will also be apparent that the present invention provides a novel conveyor unit wherein a toothed chain and a guide means cooperate for removing dug peanut vines from the ground and turning them over for a drying thereof after they have been severed from the ground. This operation is effectively performed without permitting the harvested peanut vines to bind up within the machine or to slip from the machine before the desired turning over operation has been accomplished.

Changes may be made in the combination arrangement of parts or elements as heretofore set forth in the specification and shown in the drawings, it being understood that changes may be made in the precise embodiment disclosed without departing from the spirit and scope of the invention as defined in the following claim.

I claim:

A peanut harvester adapted to be towed behind a tractor, comprising:
  a carriage having a front end and a rear end;
  connecting means mounted on the front end of said carriage for connection with the tractor;
  a pair of spaced wheels pivotally supported on the rear end of said carriage;
  means mounted on the carriage for pivoting the wheels including:
    a rotatable shaft having the wheels mounted thereon supported by and extending transversely across said carriage,
    an adjusting shaft rotatably mounted on said carriage and having one end threaded, and
    an upstanding lever member connected at a lower end thereof with said rotatable shaft and having an upper end arranged to threadedly engage the threaded end of said adjusting shaft, whereby rotation of said adjusting shaft moves said lever member rotating said rotatable shaft to pivot said wheels and thereby varying the distance between the carriage and the ground;
  at least one V-shaped digger mounted on the front end of said carriage;
  at least one rear chain sprocket rotatably mounted on the rear end of said carriage;
  a crossarm slidingly disposed on the front end of said carriage;
  at least one front chain sprocket rotatably mounted on said crossarm relatively in front of and above said V-shaped digger;
a lug having a threaded bore mounted on said carriage behind said crossarm;
a threaded bolt engaging said threaded bore and having one end in engagement with said crossarm, thereby retaining said crossarm against rearward movement on said carriage;
chain means extending between said sprockets, said chain means including:
- a plurality of link members interconnected to form an endless chain, each of said link members being engageable with said sprockets, and
- a pair of spaced teeth portions projecting outwardly from a selected number of said link members and relatively away from said sprockets, said teeth portions having a rear edge extending perpendicular to said chain means and a front edge extending at an acute angle to said chain means, whereby said teeth have a sawtooth configuration;

means for rotating said rear chain sprocket to drive said chain means;
guide means mounted on said carriage and projecting therefrom forwardly of said front chain sprocket, said guide means including a rod-like member extending along said chain means between said spaced teeth portions and terminating behind said rear chain sprocket, whereby the plants engaged by said teeth portions and guide means are retained therebetween until the plants are released behind the rear chain sprocket; and,
a pair of guide sprockets mounted on said carriage between said front and rear sprockets and engageable with said chain means, said guide means being positioned at an angle relative to said front and rear sprockets and relative to each other, whereby said chain means is crisscrossed.

References Cited by the Examiner
UNITED STATES PATENTS

| | | | |
|---|---|---|---|
| 1,004,523 | 9/11 | Asbell | 171—60 |
| 2,956,628 | 10/60 | Rogers et al. | 171—60 |
| 3,024,849 | 3/62 | Gregory | 171—61 |
| 3,059,703 | 10/62 | Pearman | 171—61 |
| 3,106,250 | 10/63 | Gregory | 171—61 |

FOREIGN PATENTS 707,043   6/41   Germany.

ANTONIO F. GUIDA, *Acting Primary Examiner.*

T. GRAHAM CRAVER, *Examiner.*